(12) United States Patent
Chacko et al.

(10) Patent No.: US 10,522,296 B2
(45) Date of Patent: *Dec. 31, 2019

(54) CAPACITOR WITH CHARGE TIME REDUCING ADDITIVES AND WORK FUNCTION MODIFIERS

(71) Applicant: KEMET Electronics Corporation, Simpsonville, SC (US)

(72) Inventors: Antony P. Chacko, Simpsonville, SC (US); Yaru Shi, Simpsonville, SC (US); Robert Ramsbottom, Simpsonville, SC (US); John T. Kinard, Simpsonville, SC (US); John Joseph Ols, Simpsonville, SC (US)

(73) Assignee: KEMET Electronics Corporation, Simpsonville, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/237,862

(22) Filed: Jan. 2, 2019

(65) Prior Publication Data

US 2019/0139709 A1   May 9, 2019

Related U.S. Application Data

(62) Division of application No. 15/425,168, filed on Feb. 6, 2017, now Pat. No. 10,204,743, which is a division of application No. 14/717,414, filed on May 20, 2015, now Pat. No. 9,793,058.

(60) Provisional application No. 62/001,165, filed on May 21, 2014.

(51) Int. Cl.
| | | |
|---|---|---|
| *H01G 9/15* | (2006.01) | |
| *H01G 9/00* | (2006.01) | |
| *H01G 9/025* | (2006.01) | |
| *H01G 9/028* | (2006.01) | |
| *H01G 9/042* | (2006.01) | |

(52) U.S. Cl.
CPC ......... *H01G 9/0036* (2013.01); *H01G 9/0032* (2013.01); *H01G 9/025* (2013.01); *H01G 9/028* (2013.01); *H01G 9/042* (2013.01); *H01G 9/0425* (2013.01); *H01G 9/15* (2013.01)

(58) Field of Classification Search
None
See application file for complete search history.

(56) References Cited

U.S. PATENT DOCUMENTS

| | | | | |
|---|---|---|---|---|
| 8,027,150 B2* | 9/2011 | Yamagishi | ........... | H01G 9/0036 |
| | | | | 361/516 |
| 8,644,003 B2* | 2/2014 | Naoi | .................... | H01G 9/0032 |
| | | | | 361/504 |
| 8,654,510 B2* | 2/2014 | Ueda | ...................... | H01G 9/025 |
| | | | | 361/526 |
| 9,793,058 B2* | 10/2017 | Chacko | ................ | H01G 9/0032 |
| 2008/0218942 A1* | 9/2008 | Yamagishi | ........... | H01G 9/0036 |
| | | | | 361/525 |

(Continued)

*Primary Examiner* — Dion Ferguson
(74) *Attorney, Agent, or Firm* — Joseph T. Guy; Patent Filing Specialist, Inc.

(57) ABSTRACT

A capacitor, and method for making the capacitor, is provided with improved charging characteristics. The capacitor has an anode, a cathode comprising a conductive polymer layer and a work function modifier layer adjacent the conductive polymer layer and a dielectric layer between the anode and the cathode.

9 Claims, 2 Drawing Sheets

(56) References Cited

U.S. PATENT DOCUMENTS

2009/0242415 A1\* 10/2009 Yoshimitsu .......... H01G 9/0036
 205/170
2011/0211295 A1\* 9/2011 Ueda ...................... H01G 9/025
 361/526

\* cited by examiner

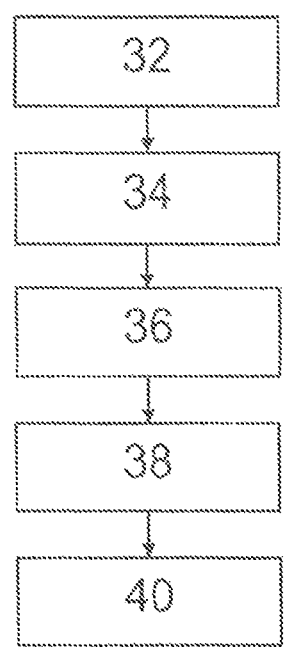

CAPACITOR WITH CHARGE TIME REDUCING ADDITIVES AND WORK FUNCTION MODIFIERS

CROSS-REFERENCE TO RELATED APPLICATIONS

The present invention is a divisional application of pending U.S. patent application Ser. No. 15/425,168 filed Feb. 6, 2017 which is, in turn, a divisional application of U.S. patent application Ser. No. 14/717,414, filed May 20, 2015 now U.S. Pat. No. 9,793,058 issued Oct. 17, 2017 which in turn claims priority to U.S. Provisional Application No. 62/001,165 filed May 21, 2014, all of which are incorporated herein by reference.

BACKGROUND

The present invention is related to an improved method of preparing a solid electrolyte capacitor and an improved capacitor formed thereby. More specifically, the present invention is related to improving the charging time of a capacitor by incorporating work function modifiers in the interfaces between the dielectric and the conductive polymer layer and between adjacent conductive polymer layers.

Solid electrolytic capacitors are widely used throughout the electronics industry. Conductive polymers are widely used in capacitors, solar cells and LED displays with exemplary conductive polymers including polypyrrole, polythiophene and polyaniline. Among them, the most commercially successful conductive polymer is poly (3,4-ethylenedioxythiophene) (PEDT). PEDT can be applied by forming the PEDT polymer in-situ by chemical or electrochemical polymerization or the PEDT can be applied as a PEDT dispersion, preferably with a polyanion, to increase solubility. More particularly, PEDT-polystyrene sulfonic acid (PEDT-PSSA) dispersions have gained a lot of attention due to the high conductivity and good film forming properties. In high voltage applications, solid electrolytic capacitors with a solid electrolyte, formed by conductive PEDT:PSSA based polymer dispersions, give excellent performance compared to conductive PEDT:TSA based polymer cathodes formed in-situ. The structure of poly(3,4-ethylenedioxythiophene)-poly(styrenesulfonate) (PEDT:PSS) consists of an insulating PSS layer surrounding doped PEDOT grains. Polystyrene sulfonate is the conjugate base of polystyrene sulfonic acid and the terms are used interchangeably herein depending on the context.

The theoretical charge required to reach rated voltage for a capacitor is given by the formula $Q=CV$, or taking the first time derivative $dQ/dt=I=C\,dV/dt$, where Q is charge, C is capacitance, V is voltage, t is time, and I is current. From these equations, the total charge required to reach the desired voltage can be determined for a capacitor having a given capacitance value. For a constant current, I, using the previous equation charge time (t) is defined by the equation $t=CV/I$. This is measured using a constant current scanner and a source meter. Using the charge time equation above, the theoretical charge time can be calculated for any given capacitor. In practice, the total charge required by certain capacitors often exceeds this theoretical prediction. Practical consequences of this anomalous charging behavior are that the charging current (dQ/dt) does not fall to low values as quickly as predicted by theory resulting in a slow charging effect. Furthermore, the charging current can exceed theoretically predicted levels when the charge voltage is ramped (dV/dt). This behavior affects measurement of DC leakage current and requires longer times to reach the specified leakage current which can affect capacitor performance in customers' circuits since when DC leakage current is measured, it takes longer than expected for the capacitor's current to fall to levels lower than the specified leakage current for the given application.

Freeman et al. (ECS Journal of solid state science and technology, 2(11)N197-N204(2013)) reported this anomalous charging behavior. They observed a very high anomalous transient current when a short voltage pulse was applied after surface mounting of PEDT:PSS based polymer tantalum capacitors on a circuit board, especially, in dry conditions. They also observed negligible transient current with PEDT:TSA based polymer tantalum capacitors. This anomalous transient current observed with PEDT:PSS did not cause any detectable permanent damage to the dielectric but it decreased with repetition of the voltage pulse as well as after exposure of the capacitor to a humid environment. They also further observed higher charging time at very low temperatures whereas charging time in humid conditions was lower. Authors suggested mobility of the PSS may be contributing to the charging time.

Koch et al., Applied Physics letter 90, 043512, 2007, observed that the work function of PEDT:PSS can be as high as 5.65 eV and that it is strongly reduced by residual water (down to 5.05 eV) as measured by XPS. In addition, uptake of the water is accompanied by pronounced surface composition changes which contribute to changes in work function. Koch et al. suggested that the preferential orientation of PEDT+ and PSS− dipoles with their negative end towards vacuum i.e., for a PSS-rich surface on the surface leads to an increase in work function. Accordingly, they observed lower work function values for samples with lower surface PSS concentration when the PEDT:PSS was treated with moisture in photovoltaic devices.

The experimental observation of lower anomalous current by Freeman et al. with moisture exposure, and the experimental observation of lower surface PSS concentration on moisture treatment by Koch et al. led to Inventor's suggestion that the surface PSS concentration may be playing a larger role in reducing anomalous current or reducing charging time. This understanding lead to efforts focusing on methods to reduce surface PSS concentration or surface charge density.

Mack et al., Application note #52078, Thermo Fischer Scientific, describes a method of measuring and mapping work function using an X-ray photoelectron spectroscopy (XPS). They observed a higher work function in a delaminated interface than in areas that were not delaminated in photovoltaic devices. This suggests that in addition to higher PSS surface concentration, delamination at the interface can also lead to higher work function. This understanding lead to efforts to solve the problems associated with poor charge characteristics by improving the lamination, or decreasing delamination, of adjacent layers.

In spite of the efforts of those of skill in the art it has not been previously realized that the charge time in a capacitor is related to the inherent work function of the conductive polymer layer itself instead of PSS mobility or delamination thereby clarifying the insufficient results from previous efforts. Provided herein is an improved capacitor, and method of making the capacitor, with lowered work function achieved by the use of work function modifiers which minimizes a physical phenomenon not previously considered in capacitors thereby mitigating, and in some cases eliminating, the undesirable charge characteristics and returning capacitors comprising conductive polymer cathodes to, or near, the theoretical charging characteristics which were previously not achieved.

SUMMARY

It is an object of the invention to provide an improved solid electrolytic capacitor.

It is another object of the invention to provide an improved method of preparing a solid electrolytic capacitor cathode with good reliability.

It is another object of the invention to provide an improved method of preparing a solid electrolytic capacitor cathode wherein the cathode has a charging time which approaches the theoretical charge time.

It is another object of the invention to provide an improved method of preparing a solid electrolytic capacitor comprising work function modifying layers which reduce the charging time wherein the layers comprise work function modifiers.

It is another object of the invention to provide an improved method of preparing a solid electrolytic capacitor comprising materials which reduce the work function It is another object of the invention to provide an improved method of preparing a solid electrolytic capacitor by incorporating work a function modifier layer between conductive polymer layers and adjacent layers.

These, and other advantages as will be realized, is provided in a capacitor comprising an anode a cathode comprising a conductive polymer layer and a work function modifier layer adjacent the conductive polymer layer and a dielectric layer between the anode and the cathode.

Yet another embodiment is provided in a method for forming a capacitor comprising:
forming an anode;
forming a dielectric on the anode; and
forming a cathode on the anode comprising:
forming a conductive polymer layer; and
forming a work function modifier layer in a location to be adjacent the conductive polymer layer.

BRIEF DESCRIPTION OF FIGURES

FIG. 3 is a schematic flow chart view of an embodiment of the invention.

DESCRIPTION

The present invention is related to an improved method of preparing a solid electrolyte capacitor and an improved capacitor formed thereby. More specifically, the present invention is related to improving the charging time of a capacitor by incorporating work function modifiers on the conducting polymer interfaces including the interface between the dielectric and a conductive polymer layer and the interface between adjacent conductive polymer layers.

Although the invention is not limited by theory, it is now believed that a correlation exists between the work function of the conductive polymer layer and charging time of the capacitor. It is further believed that the charging time can be reduced by incorporating specific work function modifiers at the interfaces of the conductive polymer layers.

It was surprisingly found that the charging time is reduced by a few classes of materials which can interact with surface PSS to reduce surface PSS concentration or charge concentration resulting from the PSS. These materials are identified herein as work function modifiers. Work function modifiers include materials which can react or interact with the surface PSS and thus reduce the surface concentration of charge from the PSS. It was also surprisingly found that charge time is reduced by these materials which either form an ionic bond or covalent bond with surface PSS. These material either react with surface PSS forming a chemically reacted mixed layer or by blending with surface PSS forming a mixed layer thus decreasing the effective surface concentration of PSS and PSS layer thickness or the surface charge related thereto. It is thought that by reducing the charge density of the PSS rich layer the surface effects causing electron blocking are reduced. It is further believed that this electron blocking property is affecting the charging time.

A capacitor comprising a work function modifier has a charging time which is no more than 1.5 times the theoretical limit. Even more preferably, a capacitor comprising the work function modifier has a charging time which is no more than 1.2 times the theoretical limit and in some embodiments a charge time can be achieved which is no more than the theoretical limit.

The invention will be described with reference to the figures forming an integral component of the instant invention. Throughout the various figures similar elements will be numbered accordingly.

Figure 1:
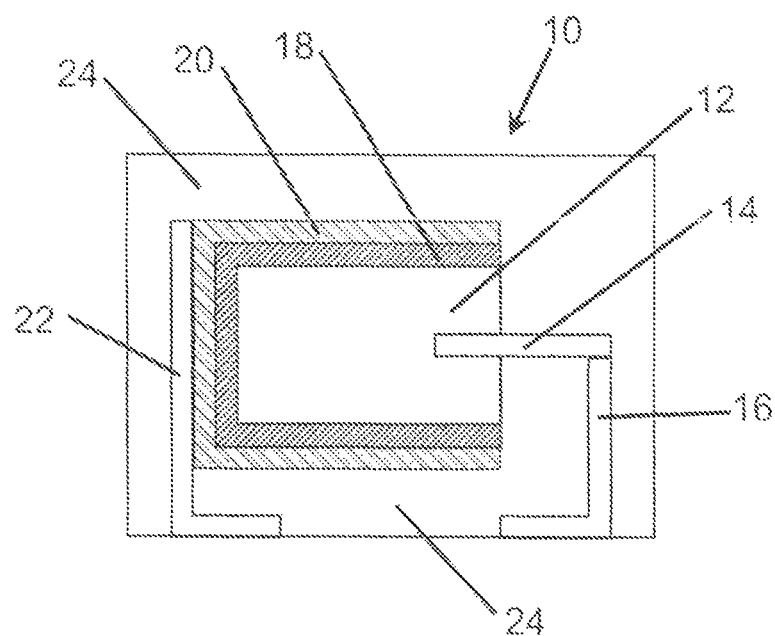
FIG. 1 is a cross-sectional schematic view of an embodiment of the invention.

An embodiment of the invention is illustrated in cross-sectional schematic side view in FIG. 1. In FIG. 1, a capacitor, generally represented at 10, comprises an anode, 12, with an anode lead wire, 14, extending therefrom or attached thereto. The anode lead wire is preferably in electrical contact with an anode lead, 16. A dielectric, 18, is formed on the anode and preferably the dielectric encases at least a portion, and preferably the entire, anode. A cathode, 20, comprising work function modifiers at an interface of the conductive polymer layer, is on the dielectric and encases a portion of the dielectric with the proviso that the cathode and anode are not in direct electrical contact. A cathode lead, 22, is in electrical contact with the cathode. In many embodiments it is preferred to encase the capacitor in a non-conductive resin, 24, with at least a portion of the anode lead and cathode lead exposed for attachment to a circuit board as would be readily understood by one of skill in the art. The cathode may comprise multiple sub-layers. The present invention is directed to improvements in the cathode layer, 20, and more particularly to the formation of the cathode layer.

Figure 2:
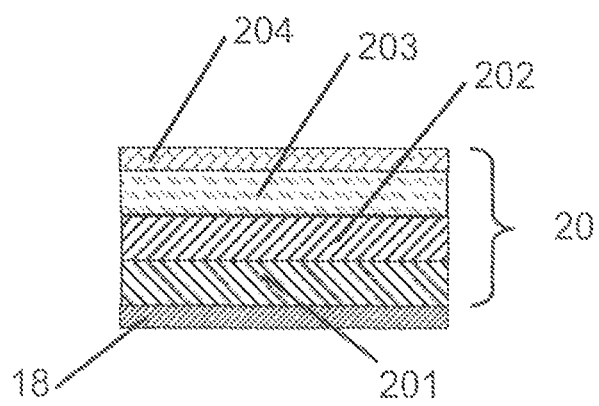
FIG. 2 is a cross-sectional schematic view of an embodiment of the invention.

An embodiment of the invention is illustrated in partial cross-sectional schematic view in FIG. 2. In FIG. 2, the cathode, 20, comprises multiple interlayers, 201-205, which are illustrated schematically, wherein the cathode is formed on the dielectric, 18. While not limited thereto the cathode interlayers are preferably selected from layers of conductive polymer, carbon containing layers and metal containing layers most preferably in sequential order. In a particularly preferred embodiment the cathode layer comprises multiple interlayers of conductive polymer, 201, formed either by in-situ polymerization or by repeated dipping in a slurry of conductive polymer with at least partial drying between dips with a work function modifying layer, 202, comprising a work function modifier between adjacent interlayers at the conducting polymer interfaces and/or between the dielectric and conductive polymer interface. It is well understood that soldering a lead frame, or external termination, to a polymeric cathode is difficult. It has therefore become standard in the art to provide conductive interlayers which allow for solder adhesion. A first conductive interlayer, 203, which is preferably at least one carbon containing interlayer, is typically applied to the outermost conductive polymer interlayer, 201. The carbon containing interlayer, or series of carbon interlayers, provides adhesion to the conductive polymer interlayer and provides a layer upon which a second conductive interlayer, which is preferably at least one metal containing interlayer, 204, will adequately adhere. A work function modifier layer is not considered necessary, or suitable, between the conductive polymer layer and the carbon layer and is therefore preferably excluded.

The carbon layer serves as a chemical barrier between the solid electrolyte and the metal containing layer. Critical properties of the carbon layer include adhesion to the underlying layer, wetting of the underlying layer, uniform coverage, penetration into the underlying layer, bulk conductivity, interfacial resistance, compatibility with the silver layer, buildup, and mechanical properties.

Particularly preferred metal containing layers comprise silver, copper or nickel. The metal interlayer allows external terminations, such as a cathode lead to be attached to the cathodic side of the capacitor such as by solder or an adhesive interlayer, 205. The cathodic conductive layer, which is preferably a silver layer, serves to conduct current from the lead frame to the cathode and around the cathode to the sides not directly connected to the lead frame. The critical characteristics of this layer are high conductivity, adhesive strength to the carbon layer, wetting of the carbon layer, and acceptable mechanical properties.

The work function modifiers are a material which reduces the work function of the conducting polymer layer applied at the interface of the conducting polymer layers. Work function modifiers reduce the work function of the conducting polymer by at least 0.1 eV to no more than 1 eV and more preferably by no more than 0.5 eV. Below about 0.1 eV the benefit is insufficient to justify the incorporation of the layer and above about 1 eV higher leakage current ensues which diminishes the quality of the capacitor. The work function modifier is preferably applied as a layer between a conductive polymer layer and an adjacent layer. The adjacent layer can be a dielectric or an adjacent conductive polymer layer.

Work function modifiers can be applied as a dispersion or solution between the conductive polymer layers. Work function is the minimum energy needed to remove an electron from a solid to a point in the vacuum immediately outside the solid surface and is therefore a physical property correlating to an electron traversing an interface. The work function is a characteristic of the surface of the material, as opposed to the bulk, and therefore nano particles and monolayers which interact with the surface PSS are preferred for demonstration of the invention.

It is hypothesized that the interaction of the work function modifiers with surface PSS is either a van der Waals' interaction, ionic bond or a covalent bond. These interactions result in the reduction of the surface PSS layer thickness due to the short range and long range interaction forces characteristics of these bonds. Work function modifiers are chosen such that they can effectively interact with surface PSS leading to a reduction in surface PSS concentration or surface charge due to the PSS concentration. This may also result in a decrease in the interfacial separation across the cathode interface.

An embodiment of the invention is the incorporation of nanoparticles of inorganic oxide such as zinc oxide, cerium oxide, indium oxide, manganese oxide and other oxides of low work function metals. The inorganic oxide dispersion can be applied as a dispersion of the nanoparticles of the oxide. These nanoparticles interact through their cations, $Zn^{2+}$, $Ce^{4+}$, with the surface PSS on the conductive polymer interfaces to reduce the effective surface PSS concentration, or surface charge density due to the PSS, and thus reduce the work function. These inorganic oxide dispersions can be applied before the cathode layers so as to interact with the PSS rich layer on the cathode side of the dielectric-cathode interface. Alternatively, they can be applied between the conducting polymer layer so that the PSS rich surface can be effectively reduced. As work function is primarily a surface phenomenon it is preferable that the particle, of the work function modifier, be a nanoparticle with a cross-sectional size of at least 10 nm to no more than 100 nm and more preferably at least 20 nm to no more than 40 nm. Below about 10 nm the material becomes very difficult to handle in a manufacturing environment. Above about 100 nm the efficiency decreases and the benefits diminish. The preferred layer thickness is preferably about the same thickness as the particle size of the work function modifier. Particularly preferred work function modifiers include hydrophilic inorganic oxides or organometallic compounds. Zinc oxide, cerium oxide and indium oxide are particularly suitable inorganic oxides for demonstration of the invention. Zinc oxide is particularly suitable for demonstration of the invention due to the ready availability, low work function and suitability with the other components of the cathode.

Another embodiment of the invention is the incorporation of organic compounds which react with the PSS layer. One example of such an organic compound is an epoxy and preferably an organic compound comprising multiple epoxy groups with bi-functional epoxy monomers being exemplary. The epoxy group can react with the sulphonic acid groups and thus effectively reduce the surface PSS concentration. These reactive compounds are applied at the conducting polymer interfaces. When applied before the conducting polymer layer, these reactive organic compounds are believed to react with surface PSS to reduce the surface concentration of PSS or surface charge density resulting from the PSSA concentration. The addition of a second organic compound, such as vinyl phosphonic acid, further reduces charging time possibly by increasing the reactivity and thus by reducing the surface PSS concentration to an even lower level.

The epoxy compound can be a monomer or an oligomer. They can be water soluble, water dispersible or soluble in various solvents. They also can be radiation curable. Since the epoxy compound is applied as separate layer, it need not be water soluble or water dispersible. Epoxy compounds dissolved in water, isopropyl alcohol (IPA) or diethylene glycol monoethyl ether acetate (DE acetate) can be applied over the dielectric layer or over cured polymer slurry layer by dipping followed by curing. Curing can be accomplished by thermal curing or radiation curing with UV curing being exemplary. It is preferable the epoxy compound have multiple epoxy groups.

The epoxy compound is preferably selected from the group consisting of cycloaliphatic epoxy resin, ethylene glycol diglycidyl ether, bisphenol A epoxy resin, bisphenol F epoxy resin, bisphenol S epoxy resin, novolac epoxy resin, aliphatic epoxy resin, Glycidylamine epoxy resin, ethylene glycol diglycidyl ether (EGDGE), propylene glycol diglycidyl ether (PGDGE), 1,4-butanediol diglycidyl ether (BDDGE), pentylene glycol diglycidyl ether, hexylene glycol diglycidyl ether, cyclohexane dimethanol diglycidyl ether, resorcinol glycidyl ether, glycerol diglycidyl ether (GDGE), glycerol polyglycidyl ethers, diglycerol polyglycidyl ethers, trimethylolpropane polyglycidyl ethers, sorbitol diglycidyl ether (Sorbitol-DGE), sorbitol polyglycidyl ethers, polyethylene glycol diglycidyl ether (PEGDGE), polypropylene glycol diglycidyl ether, polytetramethylene glycol diglycidyl ether, di(2,3-epoxypropyl)ether, 1,3-butadiene diepoxide, 1,5-hexadiene diepoxide, 1,2,7,8-diepoxyoctane, 1,2,5,6-diepoxycyclooctane, 4-vinyl cyclohexene diepoxide, bisphenol A diglycidyl ether, maleimide-epoxy compounds and derivatives thereof.

Some of the preferred epoxy monomer are listed below from cycloaliphatic epoxide is 3,4-epoxycyclohexyl methyl 3,4-epoxy-cyclohexane carboxylate with formula: (celloxide is a commercial name Is it OK to have these name here. I prefer to delete the commercial name of these epoxies?—I can not delete them—they came through as picture elements.)

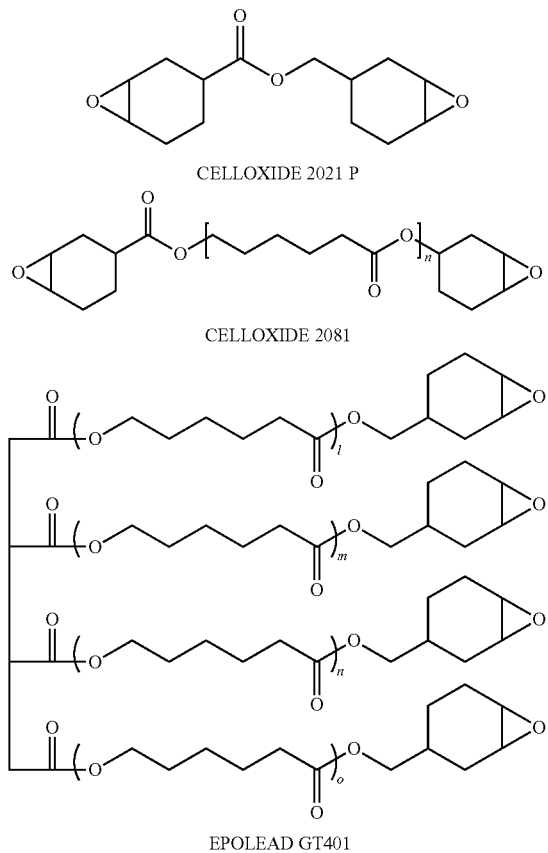

where in, n, of celloxide 2081 is an integer of 1 to 10 and the integers, I-o, of epolead GT401 are independently 1 to 10.

A third embodiment of the invention is the incorporation of organometallic compounds such as neoalkoxy titanates with several reactive moieties. Neoalkoxy titanates form a monomolecular layer at the interface and the reactive moieties, including $Ti^{4+}$, are believed to interact with surface PSS thus reducing the effective surface PSS concentration or surface charge due to the PSS. Neoalkoxy titanates are preferably used as a separate layer between adjacent conductive layers. Organotitanates are particularly suitable organometallics for demonstration of the invention. Particularly suitable organotitanates are selected from the group consisting of di-alkoxy acyl titanate, tri-alkoxy acyl titanate, alkoxy triacyl titantate and alkoxy titanate. A particularly suitable organometallic is neoalkoxy titanate with titanium IV 2,2(bis 2-propenolatomethyl) butanolato, tris neodecanoato-O; titanium IV 2,2(bis 2-propenolatomethyl) butanolato, iris(dodecyl)benzenesulfonato-O; titanium IV 2,2(bis 2-propenolatomethyl) butanolato, tris(dioctyl)phosphato-O; titanium IV 2,2(bis 2-propenolatomethyl) tris(dioctyl)pyrophosphatobutanolato-O; titanium IV 2,2(bis 2-propenolatomethyl) butanolato, tris(2-ethylenediamino) ethylato; and titanium IV 2,2(bis 2-propenolatomethyl) butanolato, tris(3-amino)phenylato being representative neoalkoxy titanates and derivatives thereof.

Another embodiment is the incorporation of cationic polyelectrolytes. Due to the cationic nature of these materials, they are believed to form ionic bonds with surface polyanionic PSS thereby reducing the surface PSS layer thickness or the charge density of the PSS layer. Any cationic polyelectrolytes can be used to reduce surface PSS concentration and reduce the work function.

A great number of polymeric structures can be transformed into a cationic polyelectrolyte structure by covalently attaching a sufficient number of quaternary ammonium groups to the polymer backbone as described in *Progress in Polymer Science* Volume 35, Issue 5, May 2010, Pages 511-577. The number of different cationic substituents is comparatively small, but the huge variability of the polymer backbone leads to cationic polyelectrolytes with a wide variety of structures and properties. Exemplary cationic groups are selected from the group consisting of amidinium, phosphonium, quaternary ammonium, guanadinium, anilinium, thiouronium, carbenium, pyridinium, imidazolium, sulfonium, diazonium and derivatives thereof.

Another embodiments is the incorporation of ionic liquids. Their strong ionic conductivity and strong interaction with adjacent ionic moieties helps to reduce the surface PSS concentration or charge density due to the PSS concentration. Cationic ionic liquids and polycationic ionic liquids are preferred for this application.

Ionic liquids (ILs) are generally defined as organic/inorganic salts with a melting point lower than 100° C. which present a good chemical and electrochemical stability, low flammability, negligible vapor pressure and high ionic conductivity. In a liquid state and with negligible vapor pressure, ionic liquids are commonly considered as green solvents for industrial production. Ionic liquids are organic salts in which the ions are poorly coordinated and melt below 100° C., or even at room temperature. Ionic liquids have a wide electrochemical operational window and comparably high matrix mobility at room temperature. Because ionic liquids are entirely composed of ions, their charge density is much higher than that of an ordinary salt solution.

Poly(ionic liquids)s (PILs), refer to a subclass of polyelectrolytes that feature an ionic liquid species in each monomer repeating unit, connected through a polymeric backbone to form a macromolecular architecture as set forth in *Progress in Polymer Science* Volume 38, Issue 7, July 2013, Pages 1009-1036. Some of the unique properties of ionic liquids are incorporated into the polymer chains, giving rise to a new class of polymeric materials. Polymeric ionic liquids expand the properties and applications of ionic liquids and common polyelectrolytes. Due to the solvent-independent ionization state of the ionic liquid species, polymeric ionic liquids are permanent and strong polyelectrolytes. The characteristic feature of absorbing water is a common feature of ionic liquids and polymeric ionic liquids.

Exemplary polymeric ionic liquids are selected from the group consisting of:

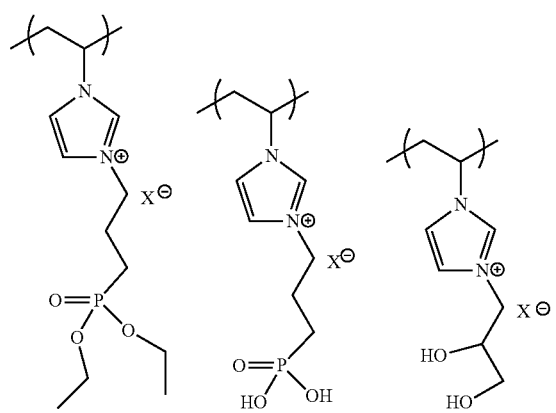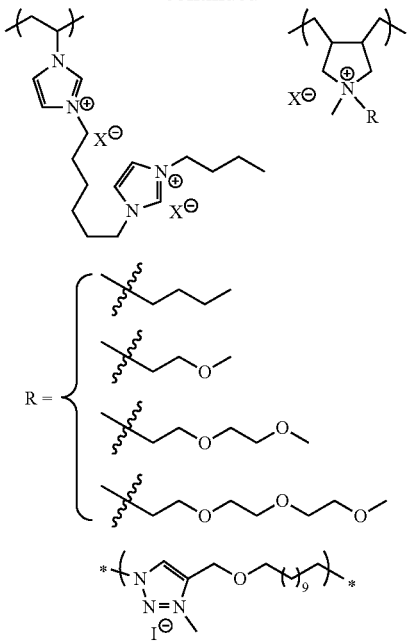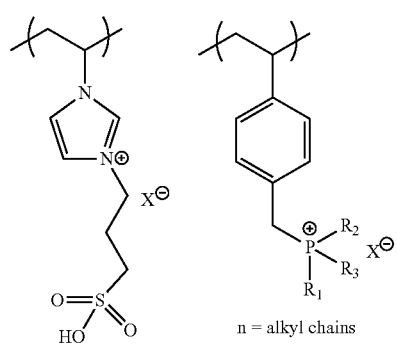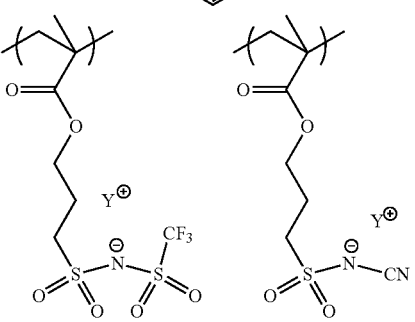
Cationic PILs

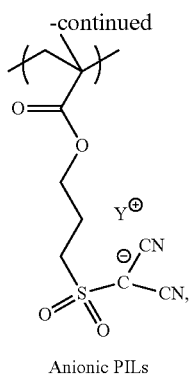

Anionic PILs 1-ethyl-3-methylimidazolium tetrafluoroborate and derivatives thereof.

Nanogels are nanometer-scale two-component systems consisting of a permanent three-dimensional network of linked polymer chains, and molecules of a liquid filling the pores of this network. According to Encyclopedia of Nanotechnology the definition of these polymeric nanoparticles may be directly derived from definition of polymeric gel, i.e., a two-component system consisting of a permanent three-dimensional network of linked polymer chains, and molecules of a solvent filling the pores of this network. Ionic liquids and polyelectrolytes are particularly suitable for the formation of a nanogel. Based on this approach polymeric nanogels are classified as particles of polymer gels with colloidal properties, having the dimensions in the order of nanometers. A particularly suitable nanogel is prepared from 1-ethyl-3-methylimidazolium tetrafluoroborate.

Nanogels can be neutral or ionic. Nano ionic liquid gels are gels where the liquid phase, percolating throughout the solid polymeric phase, is an ionic liquid. Ion gels are new kind of gels compared to the hydrogels, where the liquid phase is water, or organogels, where the liquid phase is an organic solvent. (A. S. Shaplov, et al., *Recent Advances in Innovative Polymer Electrolytes based on Poly(ionic liquid)s, Electrochim. Acta* (2015)). Additionally, the negligible vapor pressure, the non-flammability and high enough thermal stability of the ionic-liquids phase permit the use of ion gels at elevated temperatures, up to 330-350° C. The main advantages of the utilization of poly(ionic liquid)s include: high chemical affinity and miscibility between poly (ionic liquid)s and ionic liquids that make them perfect candidates to encapsulate-solidify-gellify organic salts and to develop tailor-made ion gels; high ion-ion interactions between the charged polymer matrix and the ionic filler that prevent phase separation and leakage of the liquid phase out of the gel even under the applied load as compared to other solid matrixes and low contents of ionic liquid filler necessary to reach high values of ionic conductivity. One example is the formation of carboxymethyl starch (CMS) nanogel with 50 nm less particle size by an irradiation crosslinked process on the electron beam (EB) linear accelerator.

Another embodiment is incorporation of work function modifiers in a nanogel matrix. Like hydrogels, the pores in nanogels can be filled with small molecules or macromolecules and their properties, such as swelling, degradation, and chemical functionality, can be controlled. Nanogels enable controlled and sustained release of the filled liquid or molecules at a desired site. Temperature responsive nanogels undergo a reversible volume phase transition with a change in the temperature of the environmental conditions and exhibit a controlled and sustained release of the filled molecules in response to temperature changes. Any of the work function modifiers discussed above can be incorporated into the nanogel matrix thus providing a reservoir for the work function modifiers. When capacitors are exposed to higher temperatures, PSS from the bulk of the PEDT:PSS can come to the surface or interface and form a PSS rich layer. By providing a temperature responsive nanogel comprising work function modifiers, work function modifiers can be released from the nanogel to the interface so as to effectively interact with the newly formed surface PSS. When the capacitors are exposed to both stresses and temperatures, a potential delamination between the interface can occur causing even higher work function. A temperature and stress responsive nanogel can release the work function modifiers to these interfaces and effectively reduce the surface PSS concentrations, or surface charge effects related thereto, as well as reduce the interfacial layer distances through their short and long range interactions. A particularly suitable nanogel for demonstration of the invention comprises a crosslinked linear dendritic hybrid polymers and particularly linear dendritic hybrid polymers having on average no more than 128 hydroxyl groups.

An embodiment of the invention is illustrated in flow chart form in FIG. 3. In FIG. 3, the method of forming a solid electrolytic capacitor of the instant invention is illustrated. In FIG. 3, an anode is provided at 32. A dielectric is formed on the surface of the anode at 34 with a particularly preferred dielectric being the oxide of the anode. A cathode layer is formed at 36 wherein the cathode comprises at least one conductive polymer layer and at least one work function modifier layer between the conductive polymer layer and an adjacent layer. It is preferable that the conductive polymer layer comprise multiple interlayers of conductive polymer with work function modifier applied between adjacent layers. The intrinsically conducting polymer is either formed in-situ or the layer is formed by coating with a slurry comprising intrinsically conducting polymer. The cathode preferably further comprises at least one carbon containing layer and at least one metal containing layer. Anode and cathode leads are attached to the anode and cathode respectively at 38 and the capacitor is optionally, but preferably, encased at 40 and tested.

The conductive polymer layer may be formed in a single step wherein a slurry is applied comprising at least the conductive polymer and optionally crosslinkers, and any adjuvants such as binder, dopant, organic acid and the like. Alternatively, the conductive polymer layer may be formed in multiple steps wherein components of the layer are applied separately.

It is beneficial in some embodiments to apply a crosslinker or coupling agent either in concert with the conductive polymer, in concert with the work function modifier or prior to subsequent conductive polymer layer being applied. Since the mixture of conductive polymer and crosslinkers may react prematurely it is preferably to apply cross-linker either between adjacent layers or in concert with the work function modifier thereby increasing the pot-life of a slurry comprising conductive polymer.

Particularly suitable crosslinkers include bifunctional materials wherein each functional group forms a chemical bond with one component being crosslinked. Particularly suitable crosslinkers include epoxy crosslinkers and hydrophilic coupling agents.

The anode is a conductor preferably selected from a metal or a conductive metal oxide. More preferably the anode comprises a mixture, alloy or conductive oxide of a valve metal preferably selected from Al, W, Ta, Nb, Ti, Zr and Hf. Most preferably the anode comprises at least one material selected from the group consisting of Al, Ta, Nb and NbO. An anode consisting essentially of Ta is most preferred. It is preferable that the anode be formed from a powder with a high charge density. Powders with a CV of at least 40,000 µFV/g are preferred and more preferably more than 70,000 µFV/g.

The cathode is a conductor preferably comprising a conductive polymeric material. Particularly preferred conductive polymers include intrinsically conductive polymers most preferably selected from polypyrrole, polyaniline and polythiophene. Metals can be employed as a cathode material with valve metals being less preferred. The cathode preferably includes multiple interlayers with work function modifiers between the adjacent layers wherein adhesion layers are employed to improve adhesion between the conductor and the termination. Particularly preferred adhesion interlayers include carbon, silver, copper, or another conductive material in a binder. The cathode is preferably formed by dipping, coating or spraying either a slurry of conductive polymer or a conductive polymer precursor which is polymerized by an oxidant as known in the art. Carbon and metal containing layers are typically formed by dipping into a carbon containing liquid or by coating. The carbon containing layers and metal containing layers can be formed by electroplating and this is a preferred method, in one embodiment, particularly for the metal containing layer.

The cathode layer is a conductive layer preferably comprising conductive polymer, such as polythiophene, polyaniline, polypyrrole or their derivatives; manganese dioxide, lead oxide or combinations thereof.

A particularly preferred conducting polymer is illustrated in Formula I:

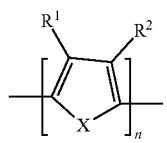

FORMULA 1

$R^1$ and $R^2$ of Formula 1 are chosen to prohibit polymerization at the β-site of the ring. It is most preferred that only α-site polymerization be allowed to proceed. Therefore, it is preferred that $R^1$ and $R^2$ are not hydrogen. More preferably, $R^1$ and $R^2$ are α-directors. Therefore, ether linkages are preferable over alkyl linkages. It is most preferred that the groups are small to avoid steric interferences. For these reasons $R^1$ and $R^2$ taken together as —O—$(CH_2)_2$—O— is most preferred.

In Formula 1, X is S or N and most preferable X is S.

$R^1$ and $R^2$ independently represent linear or branched $C_1$-$C_{16}$ alkyl or $C_2$-$C_{18}$ alkoxyalkyl; or are $C_3$-$C_8$ cycloalkyl, phenyl or benzyl which are unsubstituted or substituted by $C_1$-$C_6$ alkyl, $C_1$-$C_6$ alkoxy, halogen or $OR^3$; or $R^1$ and $R^2$, taken together, are linear $C_1$-$C_6$ alkylene which is unsubstituted or substituted by $C_1$-$C_6$ alkyl, $C_1$-$C_6$ alkoxy, halogen, $C_3$-$C_8$ cycloalkyl, phenyl, benzyl, $C_1$-$C_4$ alkylphenyl, $C_1$-$C_4$ alkoxyphenyl, halophenyl, $C_1$-$C_4$ alkylbenzyl, $C_1$-$C_4$ alkoxybenzyl or halobenzyl, 5-, 6-, or 7-membered heterocyclic structure containing two oxygen elements. $R^3$ preferably represents hydrogen, linear or branched $C_1$-$C_{16}$ alkyl or $C_2$-$C_{18}$ alkoxyalkyl; or are $C_3$-$C_8$ cycloalkyl, phenyl or benzyl which are unsubstituted or substituted by $C_1$-$C_6$ alkyl.

The conducting polymer is preferably chosen from polypyrroles, polyanilines, polythiophenes and polymers comprising repeating units of Formula I, particularly in combination with organic sulfonates: A particularly preferred polymer is 3,4-polyethylene dioxythiophene (PEDT). The polymer can be applied by any technique commonly employed in forming layers on a capacitor including dipping, spraying oxidizer dopant and monomer onto the pellet or foil, allowing the polymerization to occur for a set time, and ending the polymerization with a wash. The polymer can also be applied by electrolytic deposition as well known in the art.

The dielectric is a non-conductive layer which is not particularly limited herein. The dielectric may be a metal oxide or a ceramic material. A particularly preferred dielectric is the oxide of a metal anode due to the simplicity of formation and ease of use. The dielectric is preferably formed by dipping the anode into an anodizing solution with electrochemical conversion. Alternatively, a dielectric precursor can be applied by spraying or printing followed by sintering to form the layer. When the dielectric is an oxide of the anode material dipping is a preferred method whereas when the dielectric is a different material, such as a ceramic, a spraying or coating technique is preferred.

The anode lead wire is chosen to have low resistivity and to be compatible with the anode material. The anode lead wire may be the same as the anode material or a conductive oxide thereof. Particularly preferred anode lead wires include Ta, Nb and NbO. The shape of the anode lead wire is not particularly limiting. Preferred shapes include round, oval, rectangular and combinations thereof. The shape of the anode lead wire is preferably chosen for optimum electrical properties.

The conductive polymer has a backbone defined as —$(CR^1R^2CR^3R^4)_x$— wherein at least one of $R^1$, $R^2$, $R^3$ or $R^4$ comprises a group selected from thiophene, pyrrole or aniline which may be substituted wherein subscript x is at least 2 to no more than 1000. Hydrogen and lower alkyls of less than five carbons are particularly suitable. Thiophenes are particularly preferred with poly(3,4-ethylenedioxythiophene) being most preferred.

The construction and manufacture of solid electrolyte capacitors is well documented. In the construction of a solid electrolytic capacitor a valve metal preferably serves as the anode. The anode body can be either a porous pellet, formed by pressing and sintering a high purity powder, or a foil which is etched to provide an increased anode surface area. An oxide of the valve metal is electrolytically formed to cover up to all of the surfaces of the anode and to serve as the dielectric of the capacitor. The solid cathode electrolyte is typically chosen from a very limited class of materials, to include manganese dioxide or electrically conductive organic materials including intrinsically conductive polymers, such as polyaniline, polypyrol, polythiophene and their derivatives. The solid cathode electrolyte is applied so that it covers all dielectric surfaces and is in direct intimate contact with the dielectric. In addition to the solid electrolyte, the cathodic layer of a solid electrolyte capacitor typically consists of several layers which are external to the anode body. In the case of surface mount constructions these layers typically include: a carbon layer; a cathode conductive layer which may be a layer containing a highly conductive metal, typically silver, bound in a polymer or resin matrix; and a conductive adhesive layer such as silver filled adhesive. The layers including the solid cathode electrolyte, conductive adhesive and layers there between are referred to collectively herein as the cathode which typically includes multiple interlayers designed to allow adhesion on one face to the dielectric and on the other face to the cathode lead. A highly conductive metal lead frame is often used as a cathode lead for negative termination. The various layers connect the solid electrolyte to the outside circuit and also serve to protect the dielectric from thermo-mechanical damage that may occur during subsequent processing, board mounting, or customer use.

In the case of conductive polymer cathodes the conductive polymer is typically applied by either chemical oxidation polymerization, electrochemical oxidation polymerization or by dipping, spraying, or printing of pre-polymerized dispersions.

The backbone of a conductive polymer comprises a conjugated bonding structure. The polymer can exist in two general states, an undoped, non-conductive state, and a doped, conductive state. In the doped state, the polymer is conductive but has poor processability due to a high degree of conjugation along the polymer chain. In its undoped form, the same polymer loses its conductivity but can be processed more easily because it is more soluble. When doped, the polymer incorporates anionic moieties as constituents on its positively charged backbone. In order to achieve high conductivity, the conductive polymers used in the capacitor must be in a doped form after the completion of the process, although during the process, the polymer can be undoped or doped as necessary to achieve certain process advantages. The conductive polymer layer preferably comprises a dopant, and more preferably a polyanion dopant. The polyanion dopant can be present in an amount of up to 90 wt % even though not all polyanion functions as a dopant. It is preferable to have a dopant concentration from about 5 wt % to about 30 wt %, more preferably 12 wt % to about 25 wt % and most preferably about 21 wt %. Any suitable dopant may be used such as 5-sulfosalicylic acid, dodecylbenzenesulfonate, p-toluenesulfonate or chloride. A particularly exemplary dopant is p-toluenesulfonate. A particularly preferred polyanion dopant is polystyrene sulfonic acid.

Throughout the description stated ranges, such as 0-6 or 0.1-0.6 refer to all intermediate ranges with the same number of significant figures as the highest significant figure listed.

EXAMPLES

Comparative Example 1

A series of tantalum anodes (1500 uF, 6V) using two different sets of anodes was prepared. The tantalum was anodized to form a dielectric on the tantalum anode. The anodized anode thus formed was dipped into a solution of iron (III) toluenesulfonate oxidant for 1 minute and sequentially dipped into ethyldioxythiophene monomer for 1 minute. The coated anodized anodes were washed to remove excess monomer and by-products of the reactions after the completion of 60 minutes polymerization, which formed a thin layer of conductive polymer (PEDOT) on the dielectric of the anodes. This process was repeated 6 times. A commercial conductive polymer dispersion (Clevios KV2) was applied to form a thick external polymer layer. After drying, alternating layers of decanediamine toluenesulfonate and dispersion (Clevios KV2) were applied and repeated 3 more times. The anodes were washed and a conventional graphite coating was applied followed by a conventional silver layer.

Parts were assembled, aged and surface mounted. Charging time was measured after two reflow passes using a lead-free solder at a temperature of 260° C. Charge time was expressed as a function of the theoretical charging time.

Inventive Example 1

Parts were prepared in the same manner as in Comparative Example 1 except that the decanediamine toluenesulfonate layer was replaced with zinc oxide dispersion. Alternating layers of 40 nm zinc oxide dispersion and dispersion (Clevios KV2) were applied and repeated 3 more times. The treatment and testing was the same as Comparative Example 1.

Inventive Example 2

Parts were prepared in the same manner as in Inventive Example 1 except alternating layers of cerium oxide dispersion were used instead of zinc oxide. The treatment and testing was then the same as Comparative Example 1.

TABLE 1

| Examples | Charging time (sec) |
|---|---|
| Comparative example 1 | 7x theoretical |
| Inventive Example 1 | 1x theoretical |
| Inventive Example 2 | 1.3 x theoretical |

Inventive Example 3

Parts were prepared in the same manner as in Inventive Example 1 except a zinc oxide dispersion was applied before the first conductive polymer dispersion followed by alternating layers of decane diamine toluene sulfonate and conductive polymer dispersion (Clevios KV2). The treatment and testing was then the same as Comparative Example 1.

Inventive Example 4

Parts were prepared in the same manner as in Inventive Example 3 except a cerium oxide dispersion was used instead of zinc oxide. The treatment and testing was then the same as Comparative Example 1.

TABLE 2

| Examples | Charging time (sec) |
|---|---|
| Comparative example 1 | 7x theoretical |
| Inventive Example 3 | 1.1 x theoretical |
| Inventive Example 4 | 1.2 x theoretical |

Comparative Example 2

A series of tantalum anodes (68 uF, 16V) using two different sets of anodes was prepared. The tantalum was anodized to form a dielectric on the tantalum anode. The anode thus formed was dipped into a solution of iron (III) toluenesulfonate oxidant for 1 minute and sequentially dipped into ethyldioxythiophene monomer for 1 minute. The anodes were washed to remove excess monomer and by-products of the reactions after the completion of 60 minutes polymerization, which formed a thin layer of conductive polymer (PEDOT) on the dielectric of the anodes. This process was repeated 5 times. A commercial conductive polymer dispersion (Clevios KV2) was applied to form a thick external polymer layer. After drying, alternating layers of decanediamine, toluenesulfonate and dispersion (Clevios KV2) were applied and repeated 4 more times. The treatment and testing was then the same as Comparative Example 1.

Inventive Example 6

Parts were prepared in the same manner as in Comparative Example 2 except that the conductive polymer dispersion used comprised of bi-functional epoxy monomers instead of Cleviois KV2 dispersion. After drying alternating layers of decanediamine toluenesulfonate and conductive polymer dispersion comprising bi-functional epoxy monomers were applied and repeated 4 more times. The treatment and testing was then the same as Comparative Example 1.

Inventive Example 5

Parts were prepared in the same manner as in Comparative Example 2 except that the conductive polymer dispersion used comprised of bi-functional epoxy monomers instead of Cleviois KV2 dispersion. Parts were prepared in the same manner as in comparative example 2 except that bi-functional epoxy monomers solution was applied before the first conductive polymer dispersion layer. After drying, alternating layers of decanediamine toluenesulfonate and conductive polymer dispersion comprising bi-functional epoxy monomers were applied and repeated 4 more times. The treatment and testing was then the same as Comparative Example 6.

The results of the testing are presented in the Table.

TABLE 3

| Examples | Charging time (sec) |
| --- | --- |
| Comparative Example 2 | 6X theoretical |
| Inventive Example 5 | 1.6X theoretical |

Inventive Example 6

Parts were prepared in the same manner as in inventive example 5 except that a neoalkoxy titanate based additive (KSN100) solution was applied before the first conductive polymer dispersion layer instead of bifunctional epoxy monomers. After drying, alternating layers of decanediamine toluenesulfonate and conductive polymer dispersion comprising bi-functional epoxy monomers were applied and repeated 4 more times. The treatment and testing was then the same as Comparative

| Examples | Charging time (sec) |
| --- | --- |
| Comparative Example 2 | 6X theoretical |
| Inventive Example 6 | 2.2X theoretical |

Comparative Examples 1 and 2 demonstrate the problem in the art with Comparative Example 1 illustrating the problem when polymer slurry is used whereas in both comparative examples the charging time greatly exceeds the theoretical charge limit. Inventive examples as described in the embodiment and tables illustrate the advantage achieved with various work function modifiers. A work function modifier further improves capacitor charging beyond that previously obtained in the art.

The invention claimed is:

1. A capacitor comprising:
    an anode;
    a dielectric on said anode; and
    a cathode on said anode comprising a conductive polymer layer; and a work function modifier layer in a location to be adjacent said conductive polymer layer wherein said work function modifier layer comprises a work force modifier capable of reducing a work function of said conductive polymer layer wherein said work function modifier is an ionic liquid wherein said ionic liquid is selected from cationic ionic liquids or polycationic ionic liquids.

2. The capacitor of claim 1 wherein said work function modifier is incorporated in a nanogel.

3. The capacitor of claim 2 wherein said nanogel is chemically crosslinked.

4. The capacitor of claim 2 wherein said nanogel is crosslinked by irradiation.

5. The capacitor of claim 2 wherein said nanogel comprises linear dendritic hybrid polymers.

6. The capacitor of claim 5 wherein said linear dendritic hybrid polymers have average hydroxyl groups of no more than 128.

7. The capacitor of claim 2 where said nanogel further comprises a cationic polyelectrolyte.

8. The capacitor of claim 2 wherein said nanogel is prepared from an ionic liquid and a polyelectrolyte.

9. The capacitor of claim 2 wherein said nanogel is prepared from a polysaccharide and 1-ethyl-3-methylimidazolium tetrafluoroborate.

* * * * *